US011431395B2

(12) United States Patent
Tosato et al.

(10) Patent No.: US 11,431,395 B2
(45) Date of Patent: Aug. 30, 2022

(54) MAPPING OF WINDOWED FD BASIS TO A COMBINATORIAL INDICATOR FOR PMI REPORTING AND USAGE

(71) Applicant: Nokia Technologies Oy, Espoo (FI)

(72) Inventors: Filippo Tosato, Bures sur Yvette (FR); Marco Maso, Issy les Moulineaux (FR); Mihai Enescu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/083,841

(22) Filed: Oct. 29, 2020

(65) Prior Publication Data

US 2021/0126691 A1  Apr. 29, 2021

Related U.S. Application Data

(60) Provisional application No. 62/927,467, filed on Oct. 29, 2019.

(51) Int. Cl.
*H04B 7/02* (2018.01)
*H04B 7/06* (2006.01)
*H04B 7/0417* (2017.01)

(52) U.S. Cl.
CPC ......... *H04B 7/0639* (2013.01); *H04B 7/0417* (2013.01); *H04B 7/0626* (2013.01)

(58) Field of Classification Search
CPC ... H04B 7/0639; H04B 7/0626; H04B 7/0417
USPC ........................................................ 375/267
See application file for complete search history.

(56) References Cited

U.S. PATENT DOCUMENTS

| 10,142,004 | B2 * | 11/2018 | Park | H04L 25/03343 |
| 10,200,103 | B2 * | 2/2019 | Rahman | H04B 7/0626 |
| 2010/0284351 | A1 * | 11/2010 | Liang | H04B 7/0639 370/329 |
| 2013/0322376 | A1 * | 12/2013 | Marinier | H04B 7/0456 370/329 |
| 2016/0065279 | A1 * | 3/2016 | Wang | H04B 7/0456 375/267 |
| 2016/0315746 | A1 * | 10/2016 | Liu | H04W 72/042 |

OTHER PUBLICATIONS

"3rd Generation Partnership Project; Technical Specification Group Radio Access Network; NR; Physical layer procedures for data (Release 15)", 3GPP TS 38.214, V15.7.0, Sep. 2019, pp. 1-106.

(Continued)

*Primary Examiner* — Helene E Tayong
(74) *Attorney, Agent, or Firm* — Alston & Bird LLP (57) ABSTRACT

A UE determines a PMI, by performing at least the following: determining an intermediate set of vectors from a FD codebook; forming a subset of the intermediate set of vectors; mapping the subset of vectors to a combinatorial indicator; and forming the PMI at least from the combinatorial indicator. The UE sends the PMI toward a wireless network. A base station receives the PMI from the UE. The PMI includes a combinatorial indicator that maps to a subset of vectors from the FD codebook. The base station determines, using at least the received PMI, information from at least the FD codebook to apply to data for transmission toward the UE.

21 Claims, 6 Drawing Sheets

(56) References Cited

OTHER PUBLICATIONS

"3rd Generation Partnership Project; Technical Specification Group Radio Access Network; NR; Multiplexing and channel coding (Release 16)", 3GPP TS 38.212, V16.3.0, Sep. 2020, pp. 1-152.
International Search Report and Written Opinion received for corresponding Patent Cooperation Treaty Application No. PCT/IB2020/060141, dated Feb. 8, 2021, 17 pages.
"CSI Enhancement for MU-MIMO Support", 3GPP TSG RAN WG1 Meeting #97, R1-1907288, Agenda: 7.2.8.1, Qualcomm Incorporated, May 13-17, 2019, 15 pages.
"Enhancements on Type—II CSI Reporting", 3GPP TSG-RAN1#97, R1-1907053, Agenda: 7.2.8.1, Fraunhofer IIS, May 13-17, 2019, 16 pages.

\* cited by examiner

MAPPING OF WINDOWED FD BASIS TO A COMBINATORIAL INDICATOR FOR PMI REPORTING AND USAGE

CROSS-REFERENCE TO RELATED APPLICATIONS

This application claims the benefit of U.S. Patent Application No. 62/927,467, filed on Oct. 29, 2019, the disclosure of which is incorporated herein in its entirety.

TECHNICAL FIELD

This invention relates generally to feedback in a wireless communication system and, more specifically, relates to precoder matrix indicator (PMI) and similar feedback.

BACKGROUND

In wireless communication systems and particularly cellular systems, channel state information (CSI) is determined by a user equipment (UE) and some indicators corresponding to the CSI are fed back from the UE to the wireless network. One such indicator is a precoding matrix indicator (PMI), which allows the wireless network to select information from a codebook and apply the information to data to be transmitted to the UE.

Recently, a new codebook and PMI feedback process has been proposed. There are certain issues with selection and reporting of PMI under this new scheme, as described in more detail below.

BRIEF SUMMARY

This section is intended to include examples and is not intended to be limiting.

In an exemplary embodiment, a method is disclosed that includes determining a precoding matrix indicator by a user equipment. The determining the precoding matric indicator includes determining an intermediate set of vectors from a frequency-domain codebook, forming a subset of the intermediate set of vectors, mapping the subset of vectors to a combinatorial indicator, and forming the precoding matrix indicator at least from the combinatorial indicator. The method also includes sending by the user equipment the precoding matrix indicator toward a wireless network.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to: determine a precoding matrix indicator by a user equipment, comprising: determining an intermediate set of vectors from a frequency-domain codebook; forming a subset of the intermediate set of vectors; mapping the subset of vectors to a combinatorial indicator; and forming the precoding matrix indicator at least from the combinatorial indicator; and send by the user equipment the precoding matrix indicator toward a wireless network.

An exemplary computer program product includes a computer-readable storage medium bearing computer program code embodied therein for use with a computer. The computer program code includes: code for determining a precoding matrix indicator by a user equipment, comprising: determining an intermediate set of vectors from a frequency-domain codebook; forming a subset of the intermediate set of vectors; mapping the subset of vectors to a combinatorial indicator; and forming the precoding matrix indicator at least from the combinatorial indicator; and code for sending by the user equipment the precoding matrix indicator toward a wireless network.

In another exemplary embodiment, an apparatus comprises means for performing: determining a precoding matrix indicator by a user equipment, comprising: determining an intermediate set of vectors from a frequency-domain codebook; forming a subset of the intermediate set of vectors; mapping the subset of vectors to a combinatorial indicator; and forming the precoding matrix indicator at least from the combinatorial indicator; and sending by the user equipment the precoding matrix indicator toward a wireless network.

In an exemplary embodiment, a method is disclosed that includes receiving, at a base station, a precoding matrix indicator from a user equipment. The precoding matrix indicator comprises a combinatorial indicator that maps to a subset of vectors from a frequency-domain codebook. The method also includes determining, using at least the received precoding matrix indicator, information from at least the frequency-domain codebook to apply to data for transmission toward the user equipment.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus: receive, at a base station, a precoding matrix indicator from a user equipment, the precoding matrix indicator comprising a combinatorial indicator that maps to a subset of vectors from a frequency-domain codebook; and determine, using at least the received precoding matrix indicator, information from at least the frequency-domain codebook to apply to data for transmission toward the user equipment.

An exemplary computer program product includes a computer-readable storage medium bearing computer program code embodied therein for use with a computer. The computer program code includes: code for receiving, at a base station, a precoding matrix indicator from a user equipment, the precoding matrix indicator comprising a combinatorial indicator that maps to a subset of vectors from a frequency-domain codebook; and code for determining, using at least the received precoding matrix indicator, information from at least the frequency-domain codebook to apply to data for transmission toward the user equipment.

In another exemplary embodiment, an apparatus comprises means for performing: receiving, at a base station, a precoding matrix indicator from a user equipment, the precoding matrix indicator comprising a combinatorial indicator that maps to a subset of vectors from a frequency-domain codebook; and determining, using at least the received precoding matrix indicator, information from at least the frequency-domain codebook to apply to data for transmission toward the user equipment.

DETAILED DESCRIPTION OF THE DRAWINGS

The following abbreviations that may be found in the specification and/or the drawing figures are defined as follows:
3GPP third generation partnership project
5G fifth generation
5GC 5G core network
AMF access and mobility management function
CSI channel state information
CU central unit
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FD frequency-domain
gNB (or gNodeB) base station for 5G/NR, i.e., a node providing NR user plane and control plane protocol terminations towards the UE, and connected via the NG interface to the 5GC
I/F interface
LTE long term evolution
MAC medium access control
MME mobility management entity
ng or NG next generation
ng-eNB or NG-eNB next generation eNB
NR new radio
N/W or NW network
NZC nonzero coefficient
PDCP packet data convergence protocol
PHY physical layer
PMI precoder matrix indicator
RA reference amplitude
RAN radio access network
Rel release
RLC radio link control
RRH remote radio head
RRC radio resource control
RU radio unit
Rx receiver
SCI strongest coefficient indicator
SD spatial domain
SDAP service data adaptation protocol
SGW serving gateway
SMF session management function
TS technical specification
Tx transmitter
UCI uplink control information
UE user equipment (e.g., a wireless, typically mobile device)
UPF user plane function The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for mapping of windowed FD basis to combinatorial indicator for PMI reporting and usage. Additional description of these techniques is presented after a system into which the exemplary embodiments may be used is described.

Figure 1:
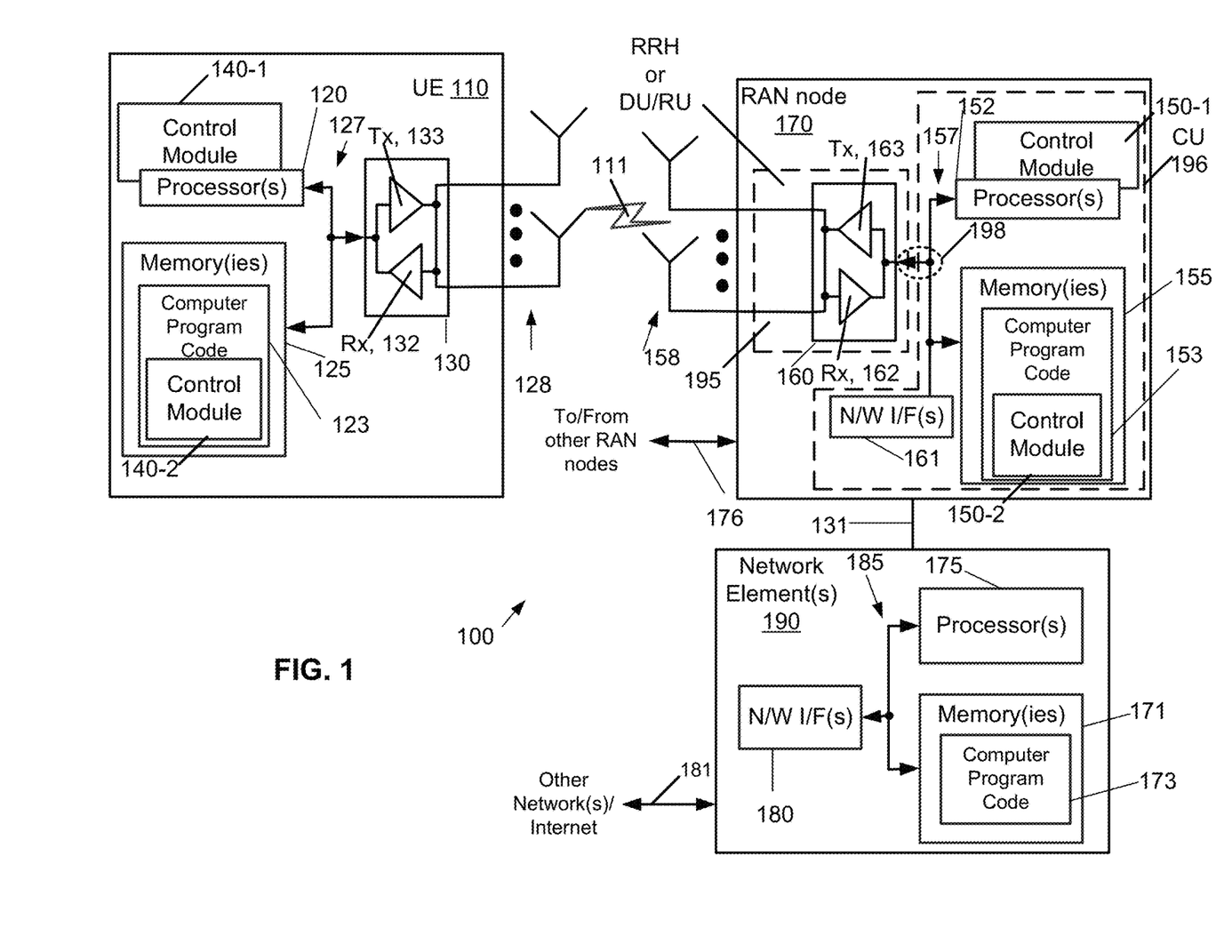
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

Figure 2:
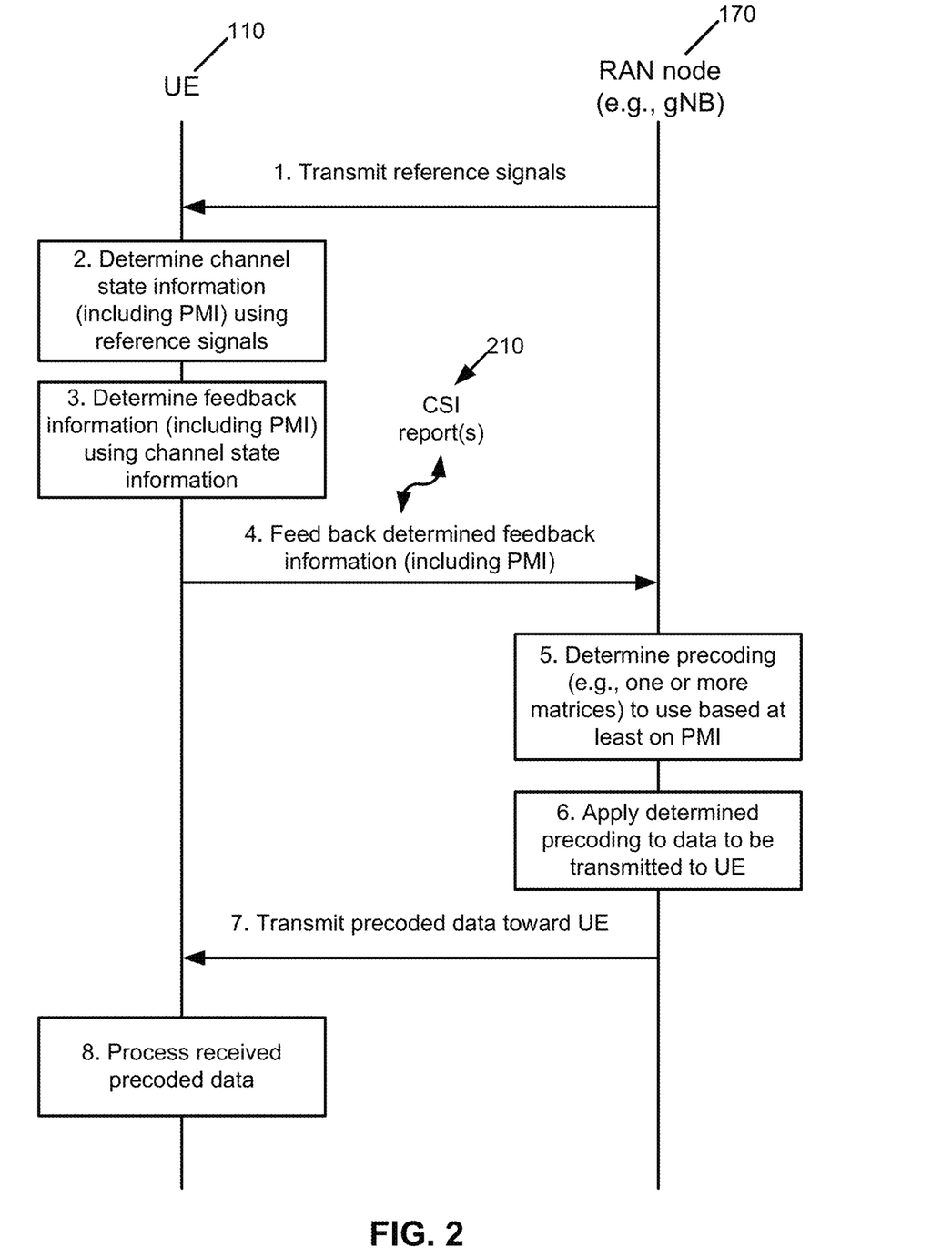
FIG. 2 is a logic flow diagram for channel state information feedback and use, and illustrates the operation of an exemplary method or methods, a result of execution of computer program instructions embodied on a computer readable memory, functions performed by logic implemented in hardware, and/or interconnected means for performing functions in accordance with exemplary embodiments.

FIG. 2 is a signaling and logic flow diagram for channel state information feedback and usage. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the control module 140 for the UE 110 and control module 150 for the RAN node 170 may include multiples ones of the blocks in FIG. 2, where each included block is an interconnected means for performing the function in the block. The blocks in FIG. 2 are assumed to be performed by the UE 110, e.g., under control of the control module 140 at least in part or performed by the RAN node 170, e.g., under control of the control module 150 at least in part.

The RAN node 170 in step 1 transmits reference signals to the UE 110. The UE in step 2 determines channel state information (CSI) (including PMI) using reference signals. In step 3, the UE 110 determines feedback information (including PMI) using the determined channel state information. The UE 110 in step 4 feeds back determined feedback information (including PMI). This information is fed back typically using one more CSI reports 210.

The RAN node 170, responsive to the reception of the feedback information, determines in step 5 precoding (e.g., one or more matrices) to use based at least on PMI. In step 6, the RAN node 170 applies the determined precoding to data to be transmitted to UE, and in step 7, transmits the precoded data toward the UE. In step 8, the UE 110 processes the received, precoded data.

It is noted that in the rest of this disclosure, the RAN node 170 is referred to as a gNB. As described above, this is not a limitation, and the RAN node 170 can be other elements, such as an eNB.

FIG. 2 represents a simplistic overview of channel state information, such as PMI, reporting and usage. The exemplary embodiments herein relate to PMI determination and reporting. First, an introduction to the technological area of PMI determination and reporting is provided, and then overviews and exemplary embodiments are described in detail.

As an introduction, in Rel-16 Type II precoder matrix indicator (PMI) feedback, a new codebook has been introduced that compresses the channel state information (CSI) across a number, $N_3$, of PMI sub-bands, where each sub-band has a PMI determined for it. A subset M of $N_3$ elements, where $M<N_3$, is selected from this frequency-domain (FD) codebook to form a basis of orthogonal vectors that are signaled from a UE 110 to the gNB 170 as part of a CSI report 210. Each codebook element is indicated by an index with alphabet set: $\{0, 1, \ldots, N_3-1\}$, where $N_3$ is the codebook size, corresponding to the number of PMI sub-bands. In an example embodiment, the indices of the M basis vectors, the FD basis subset, is reported from the UE 110 to the gNB 170.

In RAN1 #97 a sliding window mechanism was introduced to simplify the signaling of this FD basis subset for a large number of PMI sub-bands, such as for example $N_3>19$. See Sec. 7.2.8.1 "CSI enhancement for MU-MIMO support", agreement on FD basis subset selection scheme, in 3GPP, "RAN1 Chairman's Notes RAN1 #97," Reno, USA, May 2019. This window is applied to the codebook indices such that only the indices inside the window can be reported. This operation restricts the alphabet set of codebook indices that can be reported from $N_3$ to L possible values, which corresponds to a window of size L. In an example embodiment, $L=2M$. The sliding window is parametrized by its starting point, $M_{initial}$, which is signaled as part of the CSI report 310.

It was also agreed that the FD basis subset, for $N_3>19$, is indicated by a combinatorial indicator with bit-width $$\log_2 \binom{2M-1}{M-1},$$

if it's assumed that $L=2M$ and the first element is always 0 (zero). The mapping of the basis index subset to the combinatorial indicator has not been specified in the agreement. This mapping poses a problem that is elaborated below and for which the exemplary embodiments herein provide solutions.

With respect to an exemplary problem, denote an M-combination of frequency domain (FD) components for layer l=1, . . . , v, with the vector notation of their indices $$n_{3,l} = [n_{3,l}^{(0)}, \ldots, n_{3,l}^{(M-1)}], \quad (1)$$

where the elements of the combinations are selected from a codebook of $N_3$ vectors and their indices are given by $$n_{3,l}^{(f)} \in \{0, 1, \ldots, N_3-1\}, \quad (2)$$

where f=0, 1, . . . , M−1.

This M codebook vectors are indicated by an index $i_l$ (l=1, . . . , v) where $$i_l \in \left\{0, 1, \ldots, \binom{2M-1}{M-1}-1\right\}. \quad (3)$$

It is noted that the example of equation (3) is for $N_3 > 19$ and L=2M, although this is merely one example.

In this case, we may want to indicate an (M−1)-combination of elements, because the codebook indices of $n_{3,l}$ are indicated with respect to the FD component $n_{3,l}^{(fi^*)}$ associated with the strongest coefficient, as $n_{3,l}^{(f)} = (n_{3,l}^{(f)} - n_{3,l}^{(fi^*)})$ mod $N_3$, where mod is the modulo operator, and the first element of the combination in equation (1) is $n_{3,l}^{(0)} = 0$ for all layers and may not need to be reported. Therefore, only the M−1 codebook elements $[n_{3,l}^{(1)}, \ldots, n_{3,l}^{(M-1)}]$ are reported by the combinatorial indicator $i_l$, and the number of possible combinations is given by the binomial $$\binom{2M-1}{M-1},$$

assuming L=2M.

Figure 4:
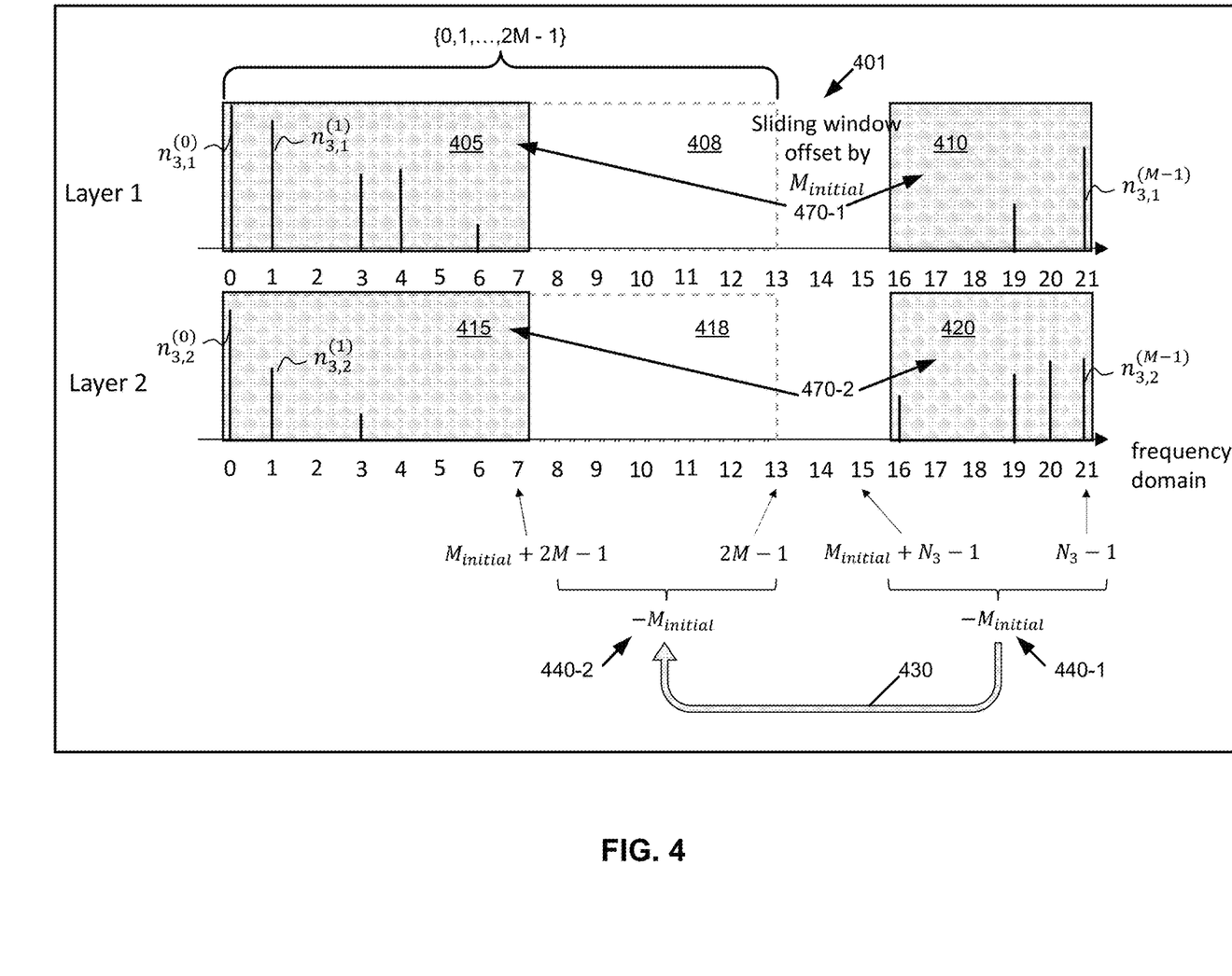
FIG. 4 shows a graphical example of a sliding window mechanism using FD codebook indices (zero to 21) in the frequency domain and corresponding mapping with a window of size 2M=14 and initial point $M_{initial}=-6$, in accordance with an exemplary embodiment.

In general, $i_l$ is a combinatorial index of order M−1 and number 2M−1, which can map an (M−1)-combination in a set of at most 2M−1 elements to a value of equation (3), when $N_3$ is large, e.g., when $N_{3>19}$ in certain exemplary embodiments. The codebook elements, $[n_{3,l}^{(1)}, \ldots, n_{3,l}^{(M-1)}]$, are defined in an alphabet $\{1,2,\ldots,N_3-1\}$ of size $N_3-1 > 2M-1$. Therefore, a combinatorial indicator with a larger number than that defined in equation (3) would be needed in principle to represent all possible (M−1)-combinations of the codebook elements. However, a sliding window mechanism has been introduced, such that only the nonzero elements in a window of size 2M and the initial point, $$M_{initial} \in \{-2M+1, -2M+2, \ldots, 0\}, \quad (4)$$

are reported. This sliding window is given by the following intermediate set:

$$\text{IntS} = \{(M_{initial}+i) \bmod N_3, i=0,1,\ldots,2M-1\}. \quad (5)$$

Hence, IntS is the new restricted set of codebook elements and the reported elements, $n_{3,l}^{(f)}$, f=1, 2, . . . M−1, can take any value in an alphabet of size 2M−1 (the zero value is always in the window, but may not need to be reported). Note that the values in the set change with the parameter $M_{initial}$ and some selected values can be outside the range $\{1, 2, \ldots, 2M-1\}$. This is described in more detail in reference to FIG. 4, described below.

To solve this problem, a mapping function is introduced in exemplary embodiments herein that maps the elements $n_{3,l}^{(f)} \in \text{IntS}\backslash\{0\} \to n_l^{(f)} \in \{1, 2, \ldots, 2M-1\}$. The notation IntS\{0} means that the value '0' is excluded from the set IntS. For example, a mapping function is introduced that allows one to indicate an (M−1)-combination of nonzero elements of an intermediate set IntS, identified by a sliding window of length 2M over a set of size $N_3 > 2M$, by a combinatorial indicator of order M−1 and number 2M−1. Note that, without this map, a combinatorial indicator of a larger number, $N_3-1$, would have to be used, which corresponds to a larger index bit-width of $$\log_2\binom{N_3-1}{M-1}$$

instead of $$\log_2\binom{2M-1}{M-1}.$$

In additional detail, this map from element $n_{3,l}^{(f)} \in \text{IntS}\backslash\{0\}$ to element $n_l^{(f)} \in \{1, 2, \ldots, 2M-1\}$ is given, in compact form, by the following:

$$n_l^{(f)} = ((n_{3,l}^{(f)} - M_{initial}) \bmod N_3 + M_{initial}) \bmod 2M, \quad (6)$$

or by the equivalent expression:

$$n_l^{(f)} = \begin{cases} n_{3,l}^{(f)} & n_{3,l}^{(f)} \leq M_{initial} + 2M - 1 \\ n_{3,l}^{(f)} - (N_3 - 2M) & n_{3,l}^{(f)} > M_{initial} + N_3 - 1 \end{cases}. \quad (7)$$

Another alternative and equivalent expression is given by the following:

$$n_l^{(f)} = \begin{cases} n_{3,l}^{(f)} & n_{3,l}^{(f)} \leq M_{initial} + 2M - 1 \\ (n_{3,l}^{(f)} + 2M) \bmod N_3 & n_{3,l}^{(f)} > M_{initial} + N_3 - 1 \end{cases}. \quad (8)$$

This operation allows mapping the set of values IntS, which changes with $M_{initial}$, to a contiguous set of 2M values $\{0, 1, 2, \ldots, 2M-1\}$. After applying this map, a ranking function can be introduced that determines the index $i_l$ from the (M−1)-combination $[n_l^{(1)}, \ldots, n_l^{(M-1)}]$. Because the combination is represented as a strictly decreasing sequence, a second map may be used from $n_l^{(f)} \in \{1, 2, \ldots, 2M-1\}$ to $x_l^{(f)} \in \{0, 1, \ldots, 2M-2\}$, for f=1, 2, . . . , M−1, such that $x_l^{(1)} > x_l^{(2)} \ldots > x_l^{(M-1)} \geq 0$. This second map is given by the following:

$$x_l^{(f)} = 2M - 1 - n_l^{(f)}, \text{ for } f=1,2,\ldots,M-1. \quad (9)$$

The combinational indicator $i_l$ corresponding to the sequence $[x_l^{(1)}, x_l^{(2)}, \ldots, x_l^{(M-1)}]$ is given by the following ranking function:

$$i_l = \sum_{f=1}^{M-1} C(x_l^{(f)}, M-f), \quad (10)$$

where $$C(x, y) = \begin{cases} \binom{x}{y} & x \geq y \\ 0 & x < y \end{cases}.$$

The indicator in (10) now satisfies the definition in equation (3).

After defining the ranking function in equation (10), the unranking procedure is straightforward and follows a standard algorithm to find the sequence $x_l^{(1)}, x_l^{(2)}, \ldots, x_l^{(M-1)}$ from index $i_l$, from which the FD basis of codebook elements $[n_{3,l}^{(1)}, \ldots, n_{3,l}^{(M-1)}]$ can be found by inverting the mapping in equations (9), and (6), (7) or (8). One example of a standard algorithm may be found in 3GPP TS 38.214 V15.6.0 (2019 May), section 5.2.2.2.3, although other algorithms may be used.

In particular, the inverse of equation (6), (7) or (8) is given by $$n_{3,l} = \begin{cases} n_l^{(f)} & n_l^{(f)} \le M_{initial} + 2M - 1 \\ n_l^{(f)} + (N_3 - 2M) & n_l^{(f)} > M_{initial} + 2N_3 - 1 \end{cases}. \quad (11)$$

The inverse of equation (9) is given by the following:

$$2M - 1 - x_l^{(f)} = n_l^{(f)}, \text{ for } f=1,2,\ldots,M-1. \quad (12)$$

Figure 3:
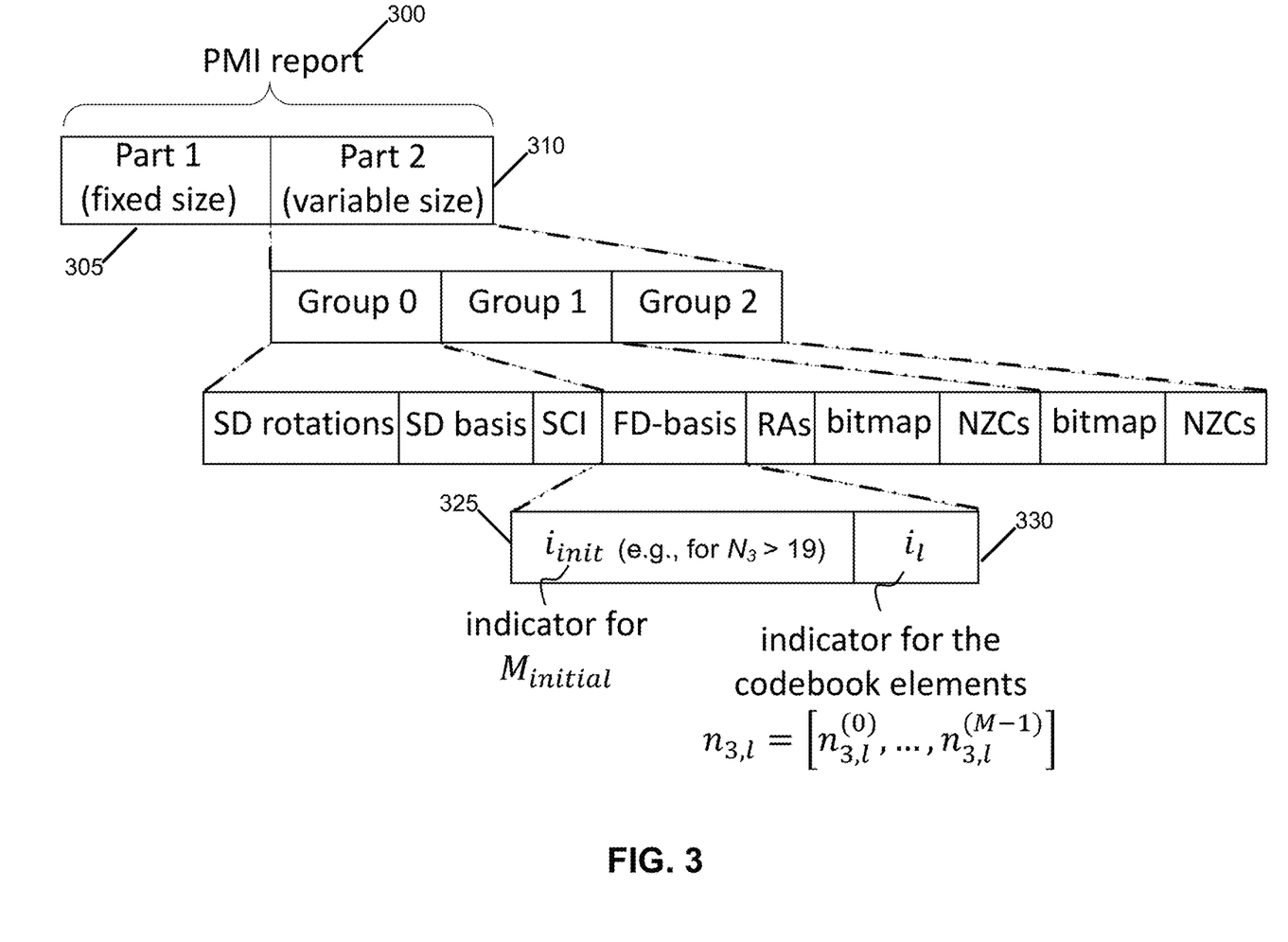
FIG. 3 shows the uplink control information (UCI) associated with an enhanced Type II PMI (precoder matrix indicator) report for a layer l, in accordance with an exemplary embodiment.

FIG. 3 shows the uplink control information (UCI) associated with an enhanced Type II PMI (precoder matrix indicator) report for a layer l. In this figure, the following acronyms are used and are defined: SD: spatial domain; SCI: strongest coefficient indicator; RA: reference amplitude; and NZC: nonzero coefficient. A PMI report 300 in this example comprises a first part (Part 1) 305 of a fixed size and a second part (Part 2) 310 having a variable size. The PMI report 300 could be part of a CSI report 210 sent in step 4 of FIG. 2, for instance. The variable size part 310 includes three groups, Group 0, Group 1, and Group 2. Group 0 comprises the following indicators: SD rotations, SD basis, and SCI. Group 1 includes the following indicators: FD-basis, RAs, a bitmap, and NZCs. Group 2 includes the following indicators: a bitmap and NZCs.

The frequency-domain (FD)-basis indicator includes the index $i_l$ and an additional indicator $i_{init}$ 325 for the parameter $M_{initial}$. In certain embodiments, the additional indicator $i_{init}$ 325 is used for a large number of PMI sub-bands, e.g., $N_3 > 19$, although this is not a limitation. The index $i_l$ for the codebook elements $n_{3,l} = [n_{3,l}^{(1)}, \ldots, n_{3,l}^{(M-1)}]$ is included as indicator 330. The determination of the index $i_l$ (as indicator 330) is one of the aspects of the exemplary embodiments herein.

FIG. 4 shows a graphical example of a sliding window mechanism using FD codebook indices (zero to 21) in the frequency domain and corresponding mapping with a window of size $L=2M=14$ and initial point $M_{initial}=-6$. More particularly, FIG. 4 is an illustration of the sliding window mechanism applied to the FD basis indication and the remap of values inside the window, with the following example values: $N_3=22$; $M=7$; and $M_{initial}=-6$. Note that because the window wraps around, when $M_{initial}$ is negative, this means the window slides to the left by $-M_{initial}$ and the window consists of two parts (parts 405 and 410 or 415 and 420) as shown in FIG. 4 positioned at the two edges of the interval of length $N_3$. Also, as described above, for an alphabet of size $2M-1$ (the zero value is always in the window, but may not need to be reported), the values in the set change with the parameter $M_{initial}$ and some selected values can be outside the range $\{1, 2, \ldots, 2M-1\}$. In FIG. 4, where $M_{initial}<0$, there are multiple values outside this range, associated with parts 405 and 408 for layer 1, or with parts 415 and 418, for layer 2. Conversely, when $M_{initial}=0$, the window corresponds to the dashed line in FIG. 4 and no selected elements, $n_{3,l}^{(f)}$, $f=1, 2, \ldots, M-1$, can be outside the range $\{1, 2, \ldots, 2M-1\}$.

The configuration in FIG. 4 is with $v=2$ layers. The window parameter $M_{initial}$, indicated by index $i_{init}$, is layer common, whereas the FD basis subset of size M is layer specific. For layer 1, the FD components $[n_{3,1}^{(0)}, n_{3,1}^{(1)}, \ldots, n_{3,1}^{(M-1)}] = [0,1,3,4,6,19,21]$ selected inside the window are illustrated, and for layer 2, the FD components $[n_{3,2}^{(0)}, n_{3,2}^{(1)}, \ldots, n_{3,2}^{(M-1)}] = [0,1,3,16,19,20,21]$ are illustrated. The map from equation (6), (7) or (8) has the effect of shifting the FD components that fall in the right-hand side edge of the FD codebook set to the left inside the empty portion of the set $\{0, 1, \ldots, 2M-1\}$. It is noted that shift is described as being to the left, although right is correct too because all shift operations in this document are circular. The shift performed by the mapping in equations (6), (7) or (8) is indicated by reference 430, which moves the selected FD components inside the right portion of the window 410 or 420 to parts 408 or 418, respectively. Note that the size of parts 410 and 420, in number of codebook indices, is $-M_{initial}$, as indicated by 440-1 and it is the same as the size of parts 408 and 418, indicated by 440-2. As a result of the shift performed by the mapping in equations (6), (7) or (8), the remapped FD components are given by $[n_1^{(0)}, n_1^{(1)}, \ldots, n_1^{(M-1)}] = [0,1,3,4,6,11,13]$ for layer 1, and $[n_2^{(0)}, n_2^{(1)}, \ldots, n_2^{(M-1)}] = [0,1,3,8,11,12,13]$ for layer 2. Note that only the last two elements are shifted for layer 1 and the last four elements are shifted for layer 2, i.e., those elements whose index exceeds $2M-1=13$.

Above, it was remarked that the mapping operation allows mapping the set of values IntS, which changes with $M_{initial}$, to a contiguous set of 2M values. FIG. 4 is an illustration of this concept. No matter what the value is of $M_{initial}$, the set of values IntS is mapped into a contiguous set of 2M indexes (e.g., zero to 13 in this case) and their corresponding FD components.

The example described above may also be used to clarify the following. Before remapping with equation (8), the (M-1)-combination (without the zeroth element) for the first layer is $[n_{3,l}^{(1)}, n_{3,l}^{(2)}, \ldots, n_{3,l}^{(6)}] = 1,3,4,6,19,21$. After applying the mapping in equation (8), one gets $[n_l^{(1)}, n_l^{(2)}, \ldots, n_l^{(6)}] = 1,3,4,6,11,13$. Finally, after applying the mapping in equation (9), one gets $[x_l^{(1)}, x_l^{(2)}, \ldots, x_l^{(6)}] = 12,10,9,7,2,0$. So, the alphabet for $x_l^{(f)}$ is $\{0, 1, \ldots, 2M-2\}$, whereas the alphabet for $n_l^{(f)}$ is $\{1, \ldots, 2M-1\}$.

Figure 5:
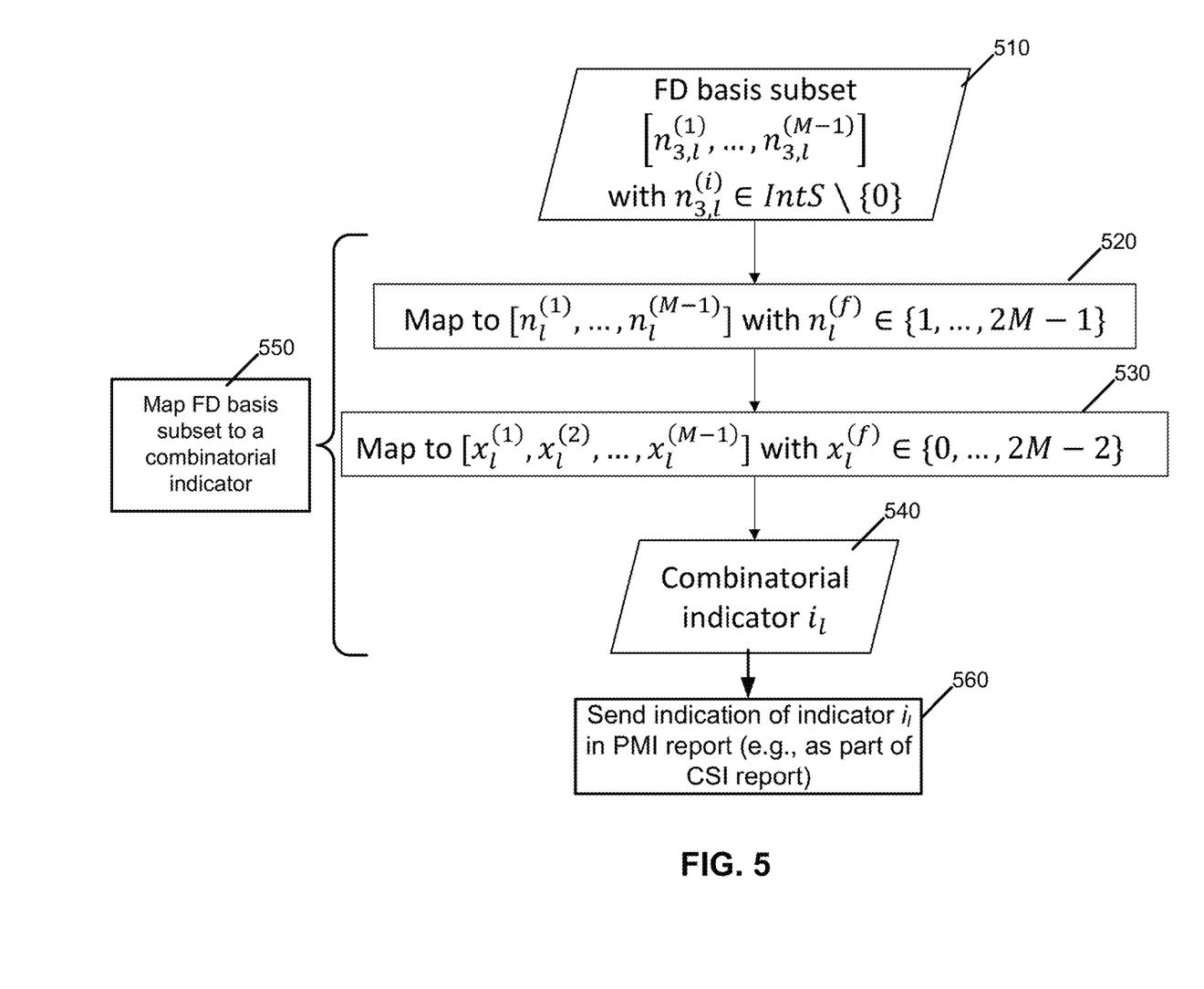
FIG. 5 shows a flow chart of the operations by a UE involved in the mapping of the FD basis subset $[n_{3,l}^{(1)}, \ldots, n_{3,l}^{(M-1)}]$ to the combinatorial indicator $i_l$ when the sliding window mechanism is applied, (for, e.g., $N_3 > 19$ in an exemplary embodiment) in accordance with an exemplary embodiment.

FIG. 5 shows a flow chart of the operations involved in the mapping of the FD basis subset $[n_{3,l}^{(1)}, \ldots, n_{3,l}^{(M-1)}]$ to the combinatorial indicator $i_l$ when the sliding window mechanism is applied. The sliding window might be applied, in an exemplary embodiment for a large number of PMI sub-bands, e.g., for $N_3 > 19$. Without the two maps, it would not be possible to indicate the FD basis subset by using a combinatorial indicator with $$\log_2 \binom{2M-1}{M-1}$$

bits. FIG. 5 is a logic flow diagram for mapping of windowed FD basis to a combinatorial indicator for PMI reporting and usage. This figure illustrates the operation of an exemplary method or methods, a result of execution of computer program instructions embodied on a computer readable memory, functions performed by logic implemented in hardware, and/or interconnected means for performing functions in accordance with exemplary embodiments. This figure is performed by the UE 110, e.g., under control of the control module 140.

In block 510, the FD basis is set as the following subset:

$$[n_{3,l}^{(1)}, \ldots, n_{3,l}^{(M-1)}],$$

with $n_{3,l}^{(f)} \in \text{IntS} \setminus \{0\}$ for $f=1, 2, \ldots M-1$. In block 520, the UE maps to $[n_l^{(1)}, \ldots, n_l^{(M-1)}]$, with $n_l^{(f)} \in \{1, 2, \ldots, 2M-1\}$. See also equations (6), (7), or (8) above. In block 530, the UE 110 maps to $[x_l^{(1)}, x_l^{(2)}, \ldots, x_l^{(M-1)}]$, with $x_l^{(f)} \in \{0, 1, \ldots, 2M-2\}$. See also equation (9) above. In block 540, the UE 110 determines the combinatorial indicator $i_l$. See also equation (10) above. It is noted, as described by block 550, the blocks 520, 530, and 540 may be considered to be a mapping of a basis subset to a combinatorial indicator. In block 560, the UE 110 sends the indication 330 (see FIG. 3) of the combinatorial indicator $i_l$ toward the gNB 170, as part of PMI report 300, which may also be part of a larger CSI report 210 (see FIG. 2) or by itself as a CSI report 210.

Figure 6:
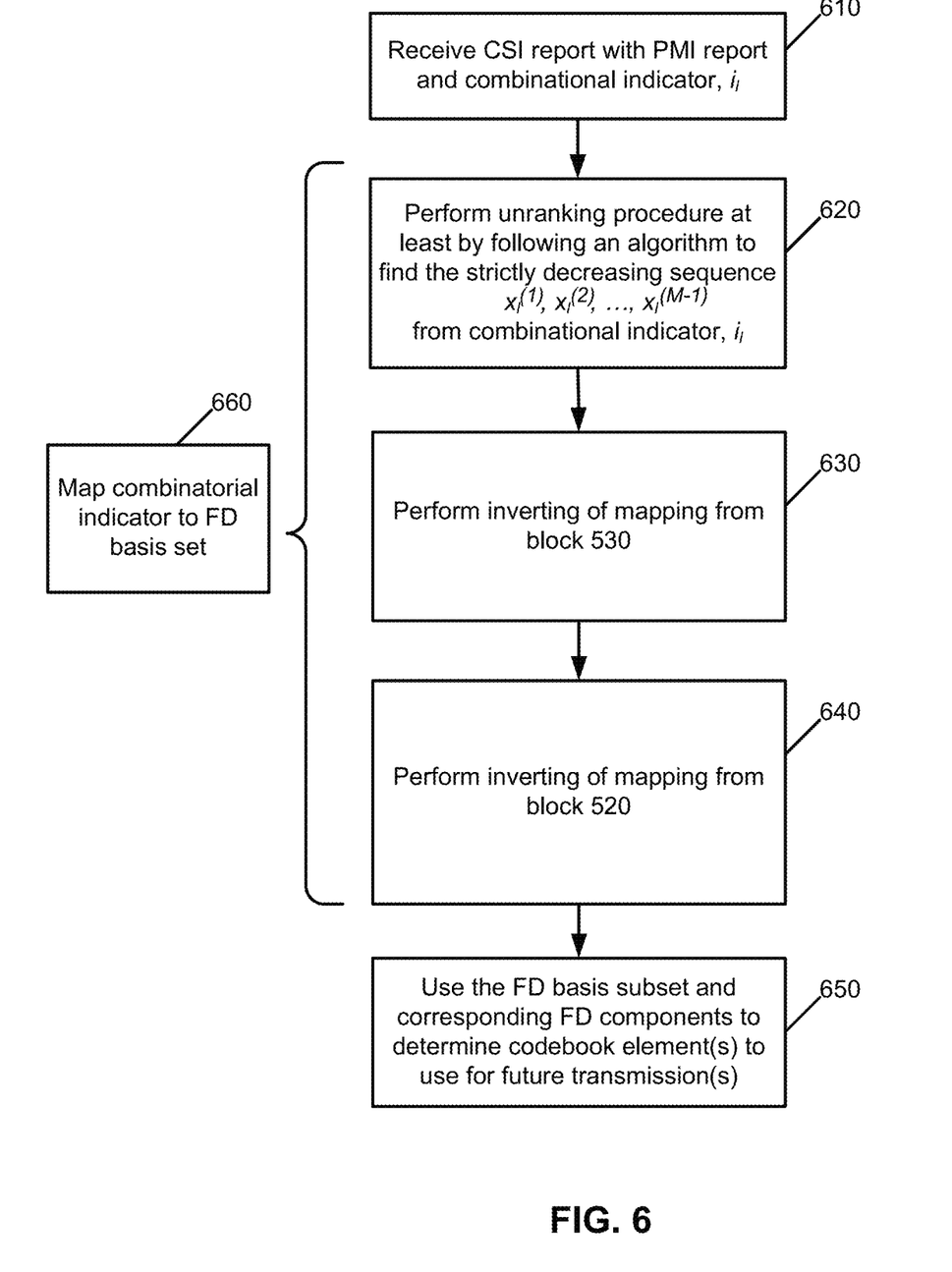
FIG. 6 is a flowchart of a method performed by a network node for mapping of windowed FD basis to a combinatorial indicator for PMI reporting and usage, and illustrates the operation of an exemplary method or methods, a result of execution of computer program instructions embodied on a computer readable memory, functions performed by logic implemented in hardware, and/or interconnected means for performing functions in accordance with exemplary embodiments.

Referring to FIG. 6, this figure is a flowchart of a method performed by a network node for mapping of a combinatorial indicator for PMI reporting and usage to windowed FD basis. This figure illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 6 are performed by a network (e.g., access) node, such as the RAN node 170 and in particular a gNB. The description of FIG. 6 assumes a gNB is used, though this but one example of a network node.

In block 610, the gNB 170 receives a CSI report with a PMI report and combinational indicator, $i_l$. The gNB 170, in block 620, performs an unranking procedure at least by following an algorithm to find the strictly decreasing sequence $[x_l^{(1)}, x_l^{(2)}, \ldots, x_l^{(M-1)}]$ from the combinational indicator, $i_l$. In block 630, the gNB 170 performs inverting of mapping from block 530. See equation (12), e.g., which maps from the strictly decreasing sequence $[x_l^{(1)}, x_l^{(2)}, \ldots, x_l^{(M-1)}]$ to the sequence $n_l^{(f)} \in \{1, 2, \ldots, 2M-1\}$, $f=1, 2, \ldots M-1$.

In block 640, the gNB 170 performs inverting of mapping from block 520. See equation (11), e.g., which maps from the sequence $n_l^{(f)} \in \{1, 2, \ldots, 2M-1\}$, $f=1, 2, \ldots M-1$ to $n_l^{(f)} \in \{0, 1, \ldots, N_3-1\}$, $f=1, 2, \ldots M-1$. Blocks 620, 630, and 640 may be considered to be a mapping of the combinatorial indicator to an FD basis subset. In block 650, the gNB 170 uses the FD basis subset and corresponding FD components to determine codebook element(s) to use for future transmission(s).

Without in any way limiting the scope, interpretation, or application of the claims appearing below, a technical effect of one or more of the example embodiments disclosed herein is addressing the fact that values in the set change with the parameter $M_{initial}$ and some selected values can be outside the range $\{1, 2, \ldots, 2M-1\}$. Another technical effect of one or more of the example embodiments disclosed herein is a mapping such that a combinatorial indicator of order $M-1$ and number $2M-1$ is used, as opposed to using a combinatorial indicator of a larger number, $N_3-1$, which corresponds to a larger index bit-width of $$\log_2 \binom{N_3 - 1}{M - 1}$$

instead of $$\log_2 \binom{2M - 1}{M - 1}.$$

A related advantage and technical effect include reduced computational complexity in the ranking and unranking algorithms because of the reduced size of the lookup table used in these algorithms, which results in a simpler search.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   determining a precoding matrix indicator by a user equipment, comprising:
      determining an intermediate set of vectors from a frequency-domain codebook;
      forming a subset of the intermediate set of vectors, wherein there are 2M vectors in the intermediate set of vectors;
      mapping the subset of vectors to a combinatorial indicator of order M−1 and number 2M−1; and
      forming the precoding matrix indicator at least from the combinatorial indicator; and
      sending by the user equipment the precoding matrix indicator toward a wireless network.

2. The method of claim 1, wherein:
   determining the intermediate set of vectors comprises:
      selecting the intermediate set of vectors based on an initial value, $M_{initial}$, where $M_{initial}$ is selected from a set of nonpositive values $\{-2M+1, -2M+2, \ldots, 0\}$, wherein the indices of the intermediate set of vectors are defined as IntS=$\{(M_{initial}+i) \bmod N_3, i=0, 1, \ldots, 2M-1\}$, where $N_3$ is a size of the frequency-domain codebook of vectors;
   forming the subset of the intermediate set of vectors further comprises:
      selecting the subset of M vectors from the intermediate set of 2M vectors;
   mapping the subset of vectors to the combinatorial indicator comprises:
      applying a first map to nonzero indices of the M vectors inside the intermediate set to obtain first intermediate indices defined between one and 2M−1;
      applying a second map to the first intermediate indices to obtain second intermediate indices defined between zero and 2M−2; and
      using the second intermediate indices as an argument in a calculation of combinatorial coefficients to calculate the combinatorial indicator; and
   forming the precoding matrix indicator at least from the combinatorial indicator further comprises:
      forming the precoding matrix indicator from an index of the initial value $M_{initial}$, wherein vectors with nonzero indices are identified by the index of the initial value $M_{initial}$ and the combinatorial indicator.

3. The method of claim 2, wherein applying the first map comprises separating the nonzero indices of the M vectors inside the intermediate set into first and second groups depending on the initial value of the intermediate set and subtracting a first preconfigured quantity from the indices of the second group, according to the following function:

$$n_l^{(f)} = \begin{cases} n_{3,l}^{(f)} & n_{3,l}^{(f)} \leq M_{initial} + 2M - 1 \\ n_{3,l}^{(f)} - (N_3 - 2M) & n_{3,l}^{(f)} > M_{initial} + N_3 - 1 \end{cases},$$

wherein $n_{3,l}^{(f)}$ are the nonzero indices of the M vectors for layer l, for f=1,2, . . . , M−1, and where the nonzero values of $n_{3,l}^{(f)}$ are selected from a value set $\{1, 2, \ldots, N_3-1\}$ associated to the vectors of the frequency-domain codebook.

4. The method of claim 2, wherein applying the second map comprises inverting a sign of the first intermediate indices and adding a second preconfigured quantity, according to the following function:

$$x_l^{(f)} = 2M - 1 - n_l^{(f)},$$

for first intermediate indices $n_l^{(f)}$ for f=1,2, . . . M−1 and for layer l.

5. The method of claim 2, wherein using the second intermediate indices as an argument in a calculation of combinatorial coefficients to calculate the combinatorial indicator comprises using the second intermediate indices as a first argument of combinatorial coefficients to calculate the combinatorial indicator associated with the vectors of nonzero index.

6. The method of claim 2, wherein the initial value of the intermediate set is common for all reported layers, whereas the combinatorial indicator is specific for each reported layer.

7. The method of claim 1, further comprising receiving by the user equipment and from the wireless network data that has had one or more codebook elements applied to the data based on the sent precoding matrix indicator.

8. An apparatus, comprising:
   one or more processors; and
   one or more memories including computer program code, wherein the one or more memories and the computer program code are configured, with the one or more processors, to cause the apparatus to:
      determine a precoding matrix indicator by a user equipment, comprising:
         determining an intermediate set of vectors from a frequency-domain codebook;
         forming a subset of the intermediate set of vectors, wherein there are 2M vectors in the intermediate set of vectors;
         mapping the subset of vectors to a combinatorial indicator of order M−1 and number 2M−1; and
         forming the precoding matrix indicator at least from the combinatorial indicator; and
      send by the user equipment the precoding matrix indicator toward a wireless network.

9. The apparatus of claim 8, wherein:
   when determining the intermediate set of vectors, the one or more memories and the computer program code are configured, with the one or more processors, to cause the apparatus to:
      select the intermediate set of vectors based on an initial value, $M_{initial}$, where $M_{initial}$ is selected from a set of nonpositive values $\{-2M+1, -2M+2, \ldots, 0\}$, wherein the indices of the intermediate set of vectors are defined as IntS=$\{(M_{initial}+i) \bmod N_3, i=0, 1, \ldots, 2M-1\}$, where $N_3$ is a size of the frequency-domain codebook of vectors;
   when forming the subset of the intermediate set of vectors, the one or more memories and the computer program code are configured, with the one or more processors, to cause the apparatus to:
      select the subset of M vectors from the intermediate set of 2M vectors;
   when mapping the subset of vectors to the combinatorial indicator, the one or more memories and the computer program code are configured, with the one or more processors, to cause the apparatus to:
apply a first map to nonzero indices of the M vectors inside the intermediate set to obtain first intermediate indices defined between one and 2M−1;
apply a second map to the first intermediate indices to obtain second intermediate indices defined between zero and 2M−2; and
use the second intermediate indices as an argument in a calculation of combinatorial coefficients to calculate the combinatorial indicator; and
when forming the precoding matrix indicator at least from the combinatorial indicator, the one or more memories and the computer program code are configured, with the one or more processors, to cause the apparatus to:
form the precoding matrix indicator from an index of the initial value $M_{initial}$, wherein vectors with nonzero indices are identified by the index of the initial value $M_{initial}$ and the combinatorial indicator.

10. The apparatus of claim 9, wherein when applying the first map, the one or more memories and the computer program code are configured, with the one or more processors, to cause the apparatus to separate the nonzero indices of the M vectors inside the intermediate set into first and second groups depending on the initial value of the intermediate set and subtract a first preconfigured quantity from the indices of the second group, according to the following function:

$$n_l^{(f)} = \begin{cases} n_{3,l}^{(f)} & n_{3,l}^{(f)} \leq M_{initial} + 2M - 1 \\ n_{3,l}^{(f)} - (N_3 - 2M) & n_{3,l}^{(f)} > M_{initial} + N_3 - 1 \end{cases},$$

wherein $n_{3,l}^{(f)}$ are the nonzero indices of the M vectors for layer l, for f=1,2, ... M−1, and where the nonzero values of $n_{3,l}^{(f)}$ are selected from a value set {1,2, ... $N_3$−1} associated to the vectors of the frequency-domain codebook.

11. The apparatus of claim 9, wherein when applying the second map, the one or more memories and the computer program code are configured, with the one or more processors, to cause the apparatus to invert a sign of the first intermediate indices and add a second preconfigured quantity, according to the following function:

$x_l^{(f)}=2M-1-n_l^{(f)}$, for first intermediate indices $n_l^{(f)}$ for f=1,2, ... M−1 and for layer l.

12. The apparatus of claim 9, wherein when using the second intermediate indices as an argument in a calculation of combinatorial coefficients to calculate the combinatorial indicator, the one or more memories and the computer program code are configured, with the one or more processors, to cause the apparatus to use the second intermediate indices as a first argument of combinatorial coefficients to calculate the combinatorial indicator associated with the vectors of nonzero index.

13. The apparatus of claim 9, wherein the initial value of the intermediate set is common for all reported layers, whereas the combinatorial indicator is specific for each reported layer.

14. The apparatus of claim 8, wherein the one or more memories and the computer program code are further configured, with the one or more processors, to cause the apparatus to:

receive by the user equipment and from the wireless network data that has had one or more codebook elements applied to the data based on the sent precoding matrix indicator.

15. An apparatus, comprising:
one or more processors; and
one or more memories including computer program code, wherein the one or more memories and the computer program code are configured, with the one or more processors, to cause the apparatus to:
receive, at a base station, a precoding matrix indicator from a user equipment, the precoding matrix indicator comprising a combinatorial indicator that maps to a subset of vectors from a frequency-domain codebook, wherein the combinatorial indicator is of order M−1 and number 2M−1; and
determine, using at least the received precoding matrix indicator, information from at least the frequency-domain codebook to apply to data for transmission toward the user equipment.

16. The apparatus of claim 15, wherein when determining, the one or more memories and the computer program code are configured, with the one or more processors, to cause the apparatus to:
obtain first and second intermediate indices, wherein the second intermediate indices, $x_l^{(f)}$ for f=1,2, ... M−1, and for layer l, are obtained by performing an unranking procedure on the combinatorial indicator.

17. The apparatus of claim 16, wherein:
the first intermediate indices, $n_l^{(f)}$ for f=1,2, ... M−1, and for layer l, are obtained from their respective second intermediate indices by inverting the following function:

$x_l^{(f)}=2M-1-n_l^{(f)}$.

18. The apparatus of claim 16, wherein the precoding matrix indicator further comprises an index of an initial value, and wherein when determining, the one or more memories and the computer program code are configured, with the one or more processors, to cause the apparatus to obtain nonzero indices of vectors $n_l^{(f)}$, for f=1,2, ... M−1, and for layer l, from their respective first intermediate indices by inverting the following function:

$$n_l^{(f)} = \begin{cases} n_{3,l}^{(f)} & n_{3,l}^{(f)} \leq M_{initial} + 2M - 1 \\ n_{3,l}^{(f)} - (N_3 - 2M) & n_{3,l}^{(f)} > M_{initial} + N_3 - 1 \end{cases},$$

wherein $M_{initial}$ is obtained from the index of the initial value, and where $n_{3,l}^{(f)}$ are associated to the vectors of the frequency-domain codebook.

19. The apparatus of claim 15, wherein when determining, the one or more memories and the computer program code are configured, with the one or more processors, to cause the apparatus to obtain at least from the vectors of the frequency-domain codebook corresponding to nonzero indices $n_{3,l}^{(f)}$, for f=1,2, ... M−1, and for layer l, precoding weights to apply to the data for transmission towards the user equipment.

20. The apparatus of claim 15, wherein the one or more memories and the computer program code are further configured, with the one or more processors, to cause the apparatus to:
transmit by the base station the data, having the information from at least the frequency-domain codebook applied, toward the user equipment.

21. A computer program product comprising a computer-readable storage medium bearing computer program code embodied therein for use with a computer, the computer program code comprising:
    code for determining a precoding matrix indicator by a user equipment, comprising:
        determining an intermediate set of vectors from a frequency-domain codebook;
        forming a subset of the intermediate set of vectors, wherein there are 2M vectors in the intermediate set of vectors;
        mapping the subset of vectors to a combinatorial indicator of order M−1 and number 2M−1; and
        forming the precoding matrix indicator at least from the combinatorial indicator; and
    code for sending by the user equipment the precoding matrix indicator toward a wireless network.

\* \* \* \* \*

UNITED STATES PATENT AND TRADEMARK OFFICE
CERTIFICATE OF CORRECTION

PATENT NO.        : 11,431,395 B2
APPLICATION NO.   : 17/083841
DATED             : August 30, 2022
INVENTOR(S)       : Filippo Tosato et al.

Page 1 of 2

It is certified that error appears in the above-identified patent and that said Letters Patent is hereby corrected as shown below:

In the Specification

In Column 10, Line 54, delete "combinational" and insert -- combinatorial --, therefor.

In Column 13, Line 33, delete "combinational" and insert -- combinatorial --, therefor.

In Column 13, Line 36, delete "combinational" and insert -- combinatorial --, therefor.

In the Claims

In Column 15, Lines 61-65, Claim 3, delete " $n_i^{(f)} = \begin{cases} n_{3,l}^{(f)} & n_{3,l}^{(f)} \le M_{initial} + 2M - 1 \\ n_{3,l}^{(f)} - (N_3 - 2M) & n_{3,l}^{(f)} > M_{initial} + N_3 - 1 \end{cases}$ " and insert -- $\{n_i^{(f)} = \begin{cases} n_{3,l}^{(f)} & n_{3,l}^{(f)} \le M_{initial} + 2M - 1 \\ n_{3,l}^{(f)} - (N_3 - 2M) & n_{3,l}^{(f)} > M_{initial} + N_3 - 1 \end{cases}\}$ --, therefor.

In Column 16, Line 4, Claim 3, delete "1)" and insert -- 1} --, therefor.

In Column 17, Lines 30-35, Claim 10, delete " $n_i^{(f)} = \begin{cases} n_{3,l}^{(f)} & n_{3,l}^{(f)} \le M_{initial} + 2M - 1 \\ n_{3,l}^{(f)} - (N_3 - 2M) & n_{3,l}^{(f)} > M_{initial} + N_3 - 1 \end{cases}$ " and insert -- $\{n_i^{(f)} = \begin{cases} n_{3,l}^{(f)} & n_{3,l}^{(f)} \le M_{initial} + 2M - 1 \\ n_{3,l}^{(f)} - (N_3 - 2M) & n_{3,l}^{(f)} > M_{initial} + N_3 - 1 \end{cases}\}$ --, therefor.

In Column 17, Line 37, Claim 10, delete "f=1,2, . . . M-1," and insert -- f=1,2, . . . , M-1, --, therefor.

In Column 17, Lines 38-39, Claim 10, delete "{1,2, . . . $N_3$" and insert -- {1,2, . . . , $N_3$ --, therefor.

In Column 17, Line 39, Claim 10, delete "1)" and insert -- 1} --, therefor.

Signed and Sealed this
Twenty-fourth Day of October, 2023

Katherine Kelly Vidal
*Director of the United States Patent and Trademark Office*

In Column 18, Line 26, Claim 16, delete "$x_l^{(f)}$" and insert -- $x_l^{(f)}$, --, therefor.

In Column 18, Line 30, Claim 17, delete "$n_l^{(f)}$" and insert -- $n_l^{(f)}$, --, therefor.